US010915503B2

(12) United States Patent
Johnston et al.

(10) Patent No.: US 10,915,503 B2
(45) Date of Patent: Feb. 9, 2021

(54) EFFICIENT DETECTION OF AVAILABLE SPACE IN A FILE SYSTEM SPACE MAP

(71) Applicant: International Business Machines Corporation, Armonk, NY (US)

(72) Inventors: Matthew S. Johnston, Rochester, MN (US); James L. Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/205,018

(22) Filed: Nov. 29, 2018

(65) Prior Publication Data

US 2020/0174971 A1    Jun. 4, 2020

(51) Int. Cl.
*G06F 16/17* (2019.01)
*G06F 3/06* (2006.01)

(52) U.S. Cl.
CPC .......... *G06F 16/1727* (2019.01); *G06F 3/064* (2013.01); *G06F 3/0608* (2013.01); *G06F 3/0643* (2013.01); *G06F 3/0644* (2013.01)

(58) Field of Classification Search
CPC ...... G06F 3/0608; G06F 3/0643; G06F 3/064; G06F 3/0644; G06F 16/1727
See application file for complete search history.

(56) References Cited

U.S. PATENT DOCUMENTS

| 6,175,900 | B1 * | 1/2001 | Forin ................... G06F 12/023 707/999.202 |
| 6,668,304 | B1 * | 12/2003 | Satran ................. G06F 11/1474 709/231 |
| 7,136,867 | B1 * | 11/2006 | Chatterjee .......... G06F 16/9027 713/171 |
| 8,966,209 | B2 | 2/2015 | Post et al. |
| 9,875,054 | B2 | 1/2018 | Vishniac et al. |
| 2016/0334997 | A1 * | 11/2016 | Wang ................... G06F 3/0605 |
| 2017/0132218 | A1 | 5/2017 | Pudipeddi et al. |

OTHER PUBLICATIONS

Jain et al., Online Conversion of File System Block Size, IP.com technical disclosure, IP.com No. IPCOM000206891D, May 12, 2011.
Disclosed Anonymously, "A method and system for an allocation aware file system", IP.com technical disclosure, IP.com No. IPCOM000237332D, Jun. 13, 2014.

(Continued)

*Primary Examiner* — Ramon A. Mercado
(74) *Attorney, Agent, or Firm* — Martin & Associates, LLC; Derek P. Martin

(57) ABSTRACT

A space allocator in a file management system maintains and uses one or more offsets and a stored value of the largest space skipped on previous scans to increase the efficiency of scans for available space in a file system space map. When the space allocator determines a current allocation request is greater than the largest space skipped in the previous scan, a last allocated offset can be used to begin scanning to reduce the portion of the map to scan in order to find available space. When the space allocator determines the current allocation request is less than or equal to the largest space skipped in the previous scan, a first available offset can be used to begin scanning for an appropriate unused space.

16 Claims, 5 Drawing Sheets

(56) References Cited

OTHER PUBLICATIONS

Disclosed Anonymously, "Alternative Space Map page size depending on contention", IP.com technical disclosure, IP.com No. IPCOM000239942D. Dec. 17, 2014.
Caulfield et al., "Providing Safe, User Space Access to Fast, Solid State Disks", Computer Science and Engineering Dept., UCSD, Mar. 2012.
Siberschatz et al., "File System Implementation—Chapter 11", 2005.
Wangelien et al., "IBM Db2: Investigating Automatic Storage Table Spaces and Data Skew", IBM Redpaper, 2017.

* cited by examiner

EFFICIENT DETECTION OF AVAILABLE SPACE IN A FILE SYSTEM SPACE MAP

BACKGROUND

1. Technical Field

This disclosure generally relates to computer processing, and more specifically relates to a system and method for efficient detection of available space in a file system space map.

2. Background Art

Computer systems often store large amounts of data on media of a data storage file system. The media is often removable. A data storage file system frequently uses a space map to describe which blocks on the media are available for use. The available space on physical removable media typically does not expand and it is common to approach or achieve near 100 percent utilization of the media so it is important to be able to efficiently find available space on the media. A common practice is to maintain a pointer into the map for the first available space on the media. When the media is very large with possibly billions of blocks, and the media is fragmented, a scan for available blocks can require scanning billions of bits. Thus the scan for available space introduces a performance challenge. When save data operations are done, the saved file is often extended by a large block that needs to be contiguous on the media. Each save operation requires a new search of the space map for the next available space to save a block of data which reduces the efficiency of the save operation.

BRIEF SUMMARY

A space allocator in a file management system maintains and uses one or more offsets and a stored value of the largest space skipped on previous scans to increase the efficiency of scans for available space in a file system space map. When the space allocator determines a current allocation request is greater than the largest space skipped in the previous scan, a last allocated offset can be used to begin scanning to reduce the portion of the map to scan in order to find available space. When the space allocator determines the current allocation request is less than or equal to the largest space skipped in the previous scan, a first available offset can be used to begin scanning for an appropriate unused space.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for a space allocator in a file management system that maintains and uses one or more offsets and a stored value of the largest space skipped on previous scans to increase the efficiency of scans for available space in a file system space map. When the space allocator determines a current allocation request is greater than the largest space skipped in the previous scan, a last allocated offset can be used to begin scanning to reduce the portion of the map to scan in order to find available space. When the space allocator determines the current allocation request is less than or equal to the largest space skipped in the previous scan, a first available offset can be used to begin scanning for an appropriate unused space.

Figure 1:
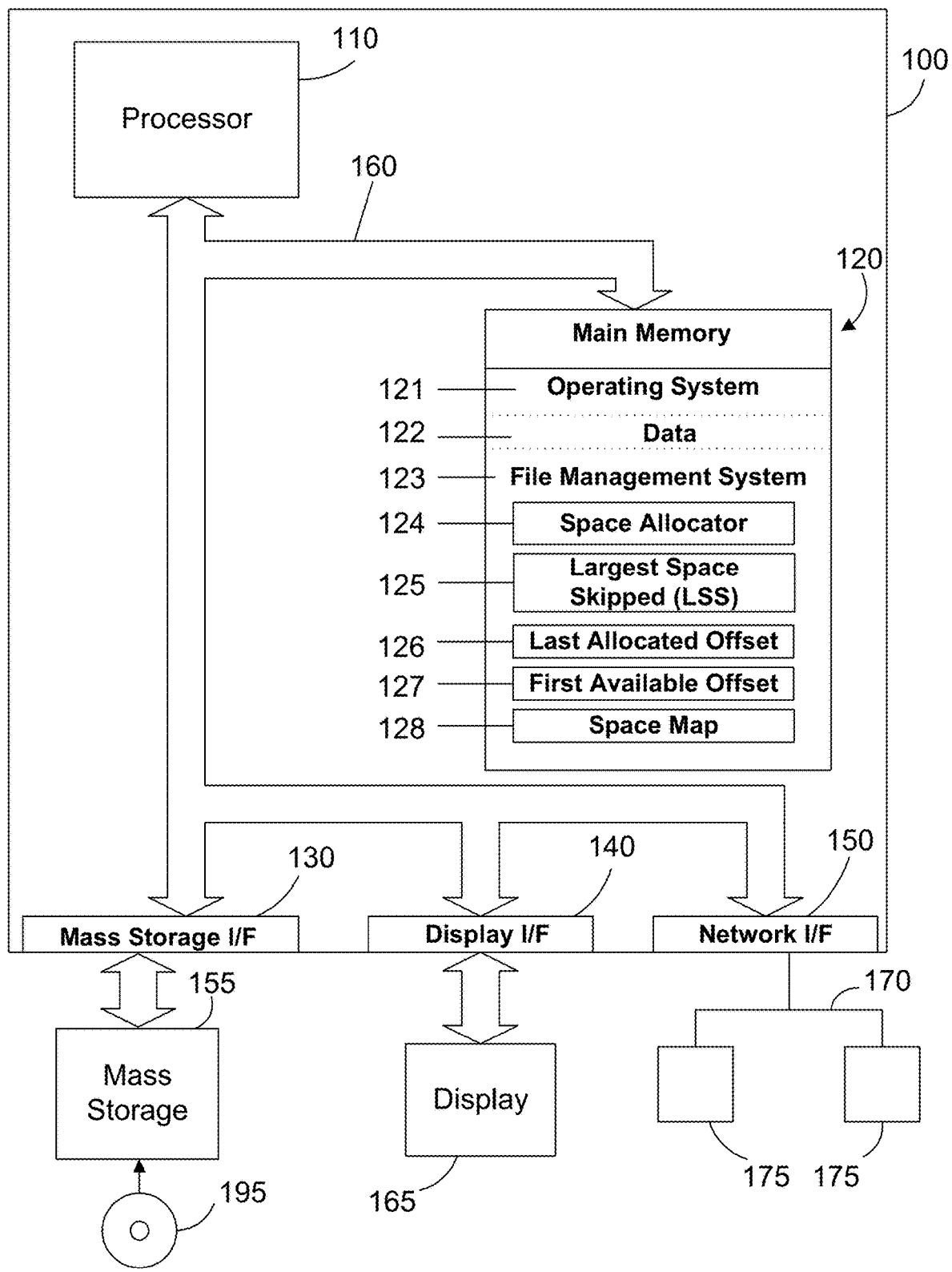
FIG. 1 is a block diagram of a computer system with a space allocator that uses one or more offsets and a stored value of the largest space skipped to increase the efficiency of scans for available space on a file system space map.

Referring to FIG. 1, a computer system 100 is one suitable implementation of a computer system that is capable of performing the computer operations described herein including scanning a file system space map for efficient detection of available space as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121 and data 122. Operating system 121 is a multitasking operating system known in the industry as IBM i; however, those skilled in the art will appreciate that the spirit and scope of this disclosure is not limited to any one operating system. Data 122 may include any data stored or used in computer system 100. The memory 120 further includes a file management system 123 with a space allocator 124. The memory 120 also includes a space map 128 and stored values for largest space skipped 125, last allocated offset 126 and first available offset 127. The space allocator 124 uses the stored values to scan the space map as described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, file management system 123, space allocator 124, largest space skipped 125, last allocated offset 126, first available offset 127 and the space map 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the file management system 123. In one implementation, the file management system 123 is part of operating system 121.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g., web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term streaming application means an application or program that processes data that may be provided to the application in a continuous data stream. The streaming application processes input data in the form of tuples. A tuple is an individual piece of data in the data stream. Typically, the data in a tuple represents the state of something at a specific point in time. For example, the tuple may represent a stock ticker quote, a patient record, or a temperature reading from an individual sensor. The data stream is thus a running sequence of tuples. Multiple streams and operators that are deployed can be represented in a dataflow graph. When a streams application is compiled, the operators and streams relationships that make up the data flow graph are broken down into one or more individual execution units that are known as processing elements. A processing element may be further broken down into operators. As used herein an operator is any basic functional block that acts on data (tuples) in flight. Thus, an operator is a portion of an application processing element or a streaming application that manipulates the tuple data from the incoming stream and produces the results in the form of an output stream.

Figure 2:
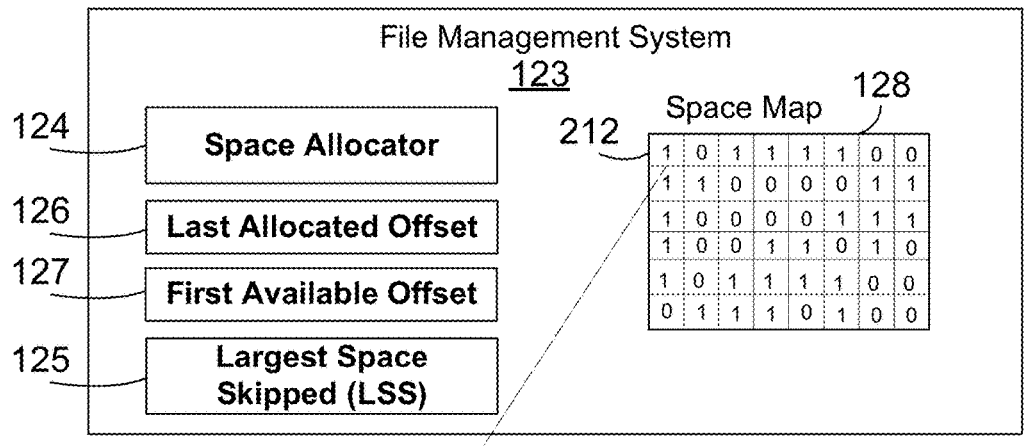
FIG. 2 illustrates a simplified block diagram of a system with a space allocator that scans a space map for available data blocks in a file system.

FIG. 2 illustrates a simplified block diagram of a system with a space allocator that scans a space map for available data blocks in a computer data system. In this example, a file management system 123 manages data stored in file system data blocks 210. The file system data blocks may be stored on computer mass storage media such as CD-RW 195 described above and shown in FIG. 1. The file management system 123 includes a space allocator 124 that maintains and uses one or more offsets into a space map 128 and a stored value of the largest space skipped 125 on previous scans to increase the efficiency of scans for available space in the file system space map 128. In this example, the space allocator 124 uses a last allocated offset 126 and a first available offset 127 as described further below. The space map 128 indicates which blocks in the file system data blocks 210 on the media are available for use. In this example, the space map 128 is a bit map with one bit for each block of the file system data blocks 210. Each bit of the space map 128 can be set to indicate whether the corresponding file system data block 210 is available or being used. Typically a set or "one" bit is used to indicate the corresponding block is in use. In the illustrated example, the first bit 212 is set to a "one" which indicates block 0 214 is currently being used to hold data. Each of the other bits in the space map similarly corresponds to a block in the file system data blocks 210.

Again referring to FIG. 2, the space map 128 may be located within the file management system 123 as shown and thus reside in main memory 120 in FIG. 1. Alternatively the space map may reside at another location accessible to the space allocator but outside the file management system 123. The file system data blocks 210 shown in FIG. 2 represent any suitable data structure of a data storage system. For example, each block of the file system data blocks may represent a sector of a disk containing a number of bytes of data such as 256 bytes or 512 bytes. A data block of the file system data blocks 210 do not necessarily directly correspond to a single data file.

Figure 3:
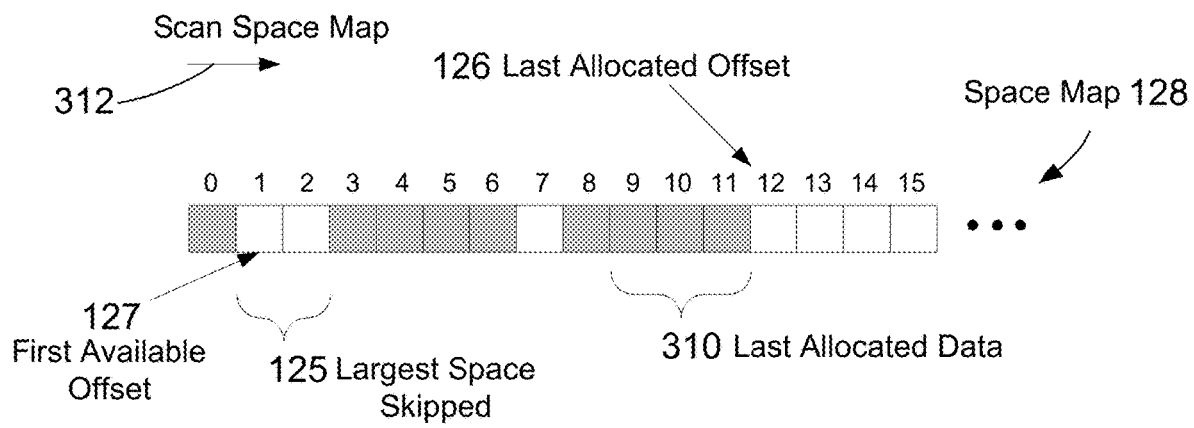
FIG. 3 is a simplified block diagram that illustrates scanning a space map for available space in a computer file system.

FIG. 3 is a simplified block diagram that illustrates scanning a space map for available space in a computer data system. In this example, the space map 128 from FIG. 2 is partially represented by a sequence of boxes labeled 0 through 15. For increased visual clarity, in this and subsequent examples the boxes of the space map are darkened to indicate the corresponding block of the file system data blocks 210 (FIG. 2) is in use. Thus the darkened boxes here are equivalent to a "one" bit in the space map described above. When the space allocator 124 (FIG. 2) receives an allocation request it needs to scan the space map to find a space in the file system data blocks that is sufficient in size to store data associated with the allocation request. The scan for available space may initially start at the beginning of the space map and proceed into the space map as indicated by the arrow 310. Subsequently, the scan to find available blocks may begin at the stored offsets as described below.

Again referring to FIG. 3, as introduced above the space allocator 124 (FIG. 2) efficiently scans a space map by storing a largest space skipped 125 and one or more offsets into the space map. The largest space skipped 125 is the largest number of contiguous empty or zero bits that indicate unused file system data blocks that were skipped in a previous scan. In the example shown in FIG. 3, the largest space skipped 125 has a value of 2, corresponding to bit 1 and bit 2. The largest space skipped 125 will always be a whole number. The offsets may be expressed as a location in the bitmap or an offset into the bitmap from the beginning location. For example, if the last allocated data 310 was bits 9 through 11, then the value of the last allocated offset 126 is 12 as shown. In this example, the last allocated offset 126 indicates the next location after the last data that was stored in the space map on the most recent transaction. The first available offset 318 is an offset into the space map 128 that indicates the first unused or empty location in the file system data blocks 210. The first available offset 127 and the last allocated offset 126 can be used as a starting place for a scan. When the space allocator 124 (FIG. 2) receives an allocation request it compares the size of data in the allocation request to the stored largest space skipped. The space allocator scans the space map for a number of data blocks that is sufficient in size to store data associated with the allocation request. The space allocator starts the scan from one of the stored offsets depending on the size of the space needed compared to the stored largest space skipped as described below. The space allocator stores the data in the newly found space and then updates the largest space skipped and the stored offsets.

Figure 4A:
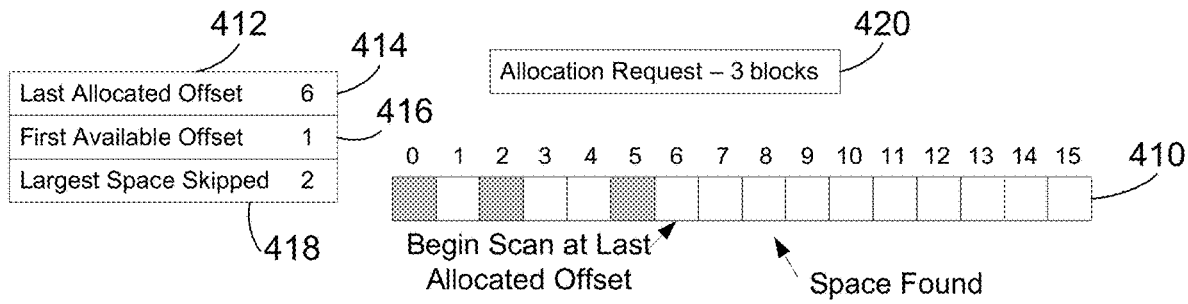
FIGS. 4A through 4C illustrate a simplified example of scanning a space map for available space in a file system.
Figure 4B:
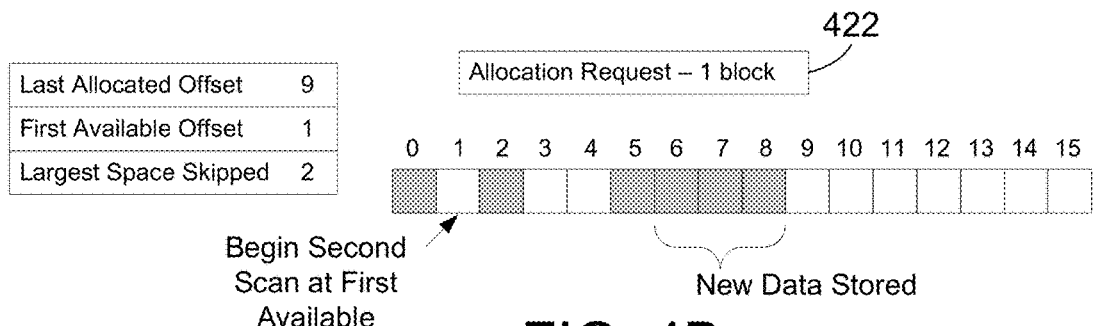
Figure 4C:

FIGS. 4A through 4C illustrate a simplified example of scanning a space map for available space in a computer data file system. Each of the figures includes a partial space map 410 similar to that described above with reference to FIG. 3. At the left of each of these figures is a box 412 which includes a value for the last allocated offset 414, the first available offset 416 and the largest space skipped 418. These values are examples of the corresponding values of the same name in FIG. 1. Each of these values represent the current state of the saved values for a snapshot in time corresponding to the partial space map shown. FIG. 4A illustrates the initial conditions for the following examples. Initially the space map 410 indicates blocks 0, 2 and 5 are in use as shown by the darkened boxes in the space map.

Again referring to FIG. 4A, it is assumed that after the time of the initial conditions the space allocator receives an allocation request 420 to store data that requires 3 blocks in the file system data blocks. The space allocator compares the size of the data in the allocation request (3 blocks) to the current stored largest space skipped 418 (2 blocks). Since the size of data in the allocation request (3 blocks) is not less than or equal to the stored largest space skipped (2 blocks), the space allocator can start the scan for the needed space for the allocation request from blocks after the last allocated offset (block 6) as shown in FIG. 4A. The space allocator scans subsequent blocks from the begin point of the scan until it finds a space large enough to accommodate the allocation request. In this example, the space is found in blocks 6 through 8. The new data is then stored in blocks 6 through 8. FIG. 4 B illustrates the state of the space map after the transaction of storing the three new blocks. The space allocator then makes the appropriate updates to the stored values 412 for this transaction. If a space is skipped during the scan then the space allocator updates the largest space skipped to the largest space encountered during the scan. In the example of FIG. 4B no space was skipped and thus the largest space skipped remains at 2. In this case, where the scan began at the block after the last allocated offset, the first available offset remains the same and thus is still 1 as shown. The space allocator then updates the last allocated offset, which is now 9 as shown in FIG. 4B.

It is assumed that after the time of the last transaction as shown in FIG. 4 B, the space allocator receives a second allocation request 422 to store data that requires 1 block in the file system data blocks. The space allocator compare the size of the data in the allocation request (1 block) to the current stored largest space skipped 418 (2 blocks). Since the size of data in the allocation request (1 block) is less than or equal to the stored largest space skipped (2 blocks), the space allocator can use space indicated by the largest skipped space. The space allocator first clears the largest space skipped and the last allocated offset before beginning the scan. The space allocator can then start scanning for the needed space for the allocation request from the first available offset (block 1) as shown in FIG. 4B. The space allocator scans subsequent blocks from the begin point of the scan until it finds a space large enough to accommodate the allocation request. In this example, the space is found in block 1. The new data is then stored in block 1. FIG. 4 C illustrates the state of the space map after the transaction of storing the one new block. The space allocator then makes the appropriate updates to the stored values 412 for this transaction. If a space is skipped during the scan then the space allocator puts the largest space skipped into the largest space skipped stored value. In the example of FIG. 4C no space was skipped so the space allocator updates the first available offset to the space after the last allocated space. In this case, where the scan began at the first available offset, the first available offset is set to the next space after the last allocated space as a starting point for subsequent scans. In this case, the first available offset is thus set to 2. The space allocator then updates the last allocated offset, which is now 2 as shown.

Figure 5:
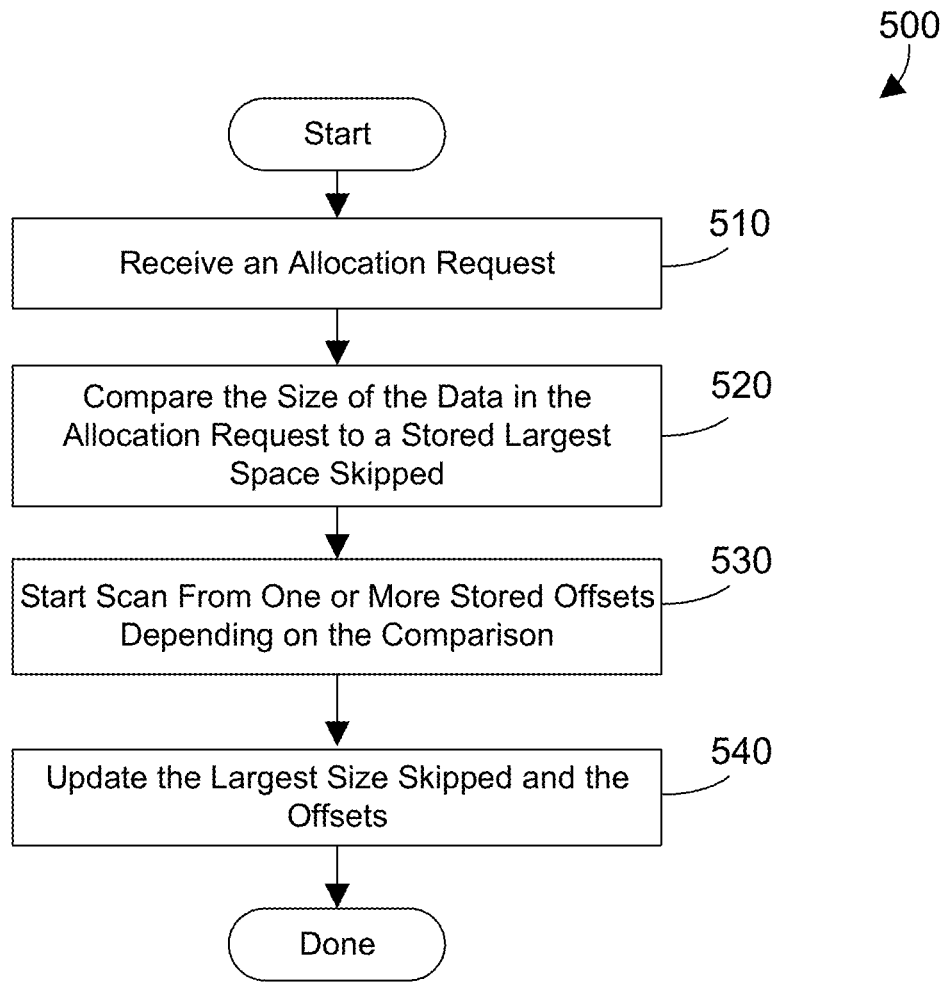
FIG. 5 is flow diagram of an example method of scanning a file system space map for efficient detection of available space.

Referring to FIG. 5, a method 500 shows one suitable example for using stored offsets and a stored largest space skipped to increase the efficiency of scans for available space in a file system space map. Portions of method 500 are preferably performed by the space allocator 124 and the file system manager 125 shown in FIG. 1. First, receive an allocation request (step 510). Next, compare the size of the data in the allocation request to a stored largest space skipped (step 520). Start the scan for space for the allocation request from one or more stored offsets depending on the comparison (step 530). Update the largest space skipped and the offsets after an appropriately sized space is found (step 540). Method 500 is then done.

Figure 6:
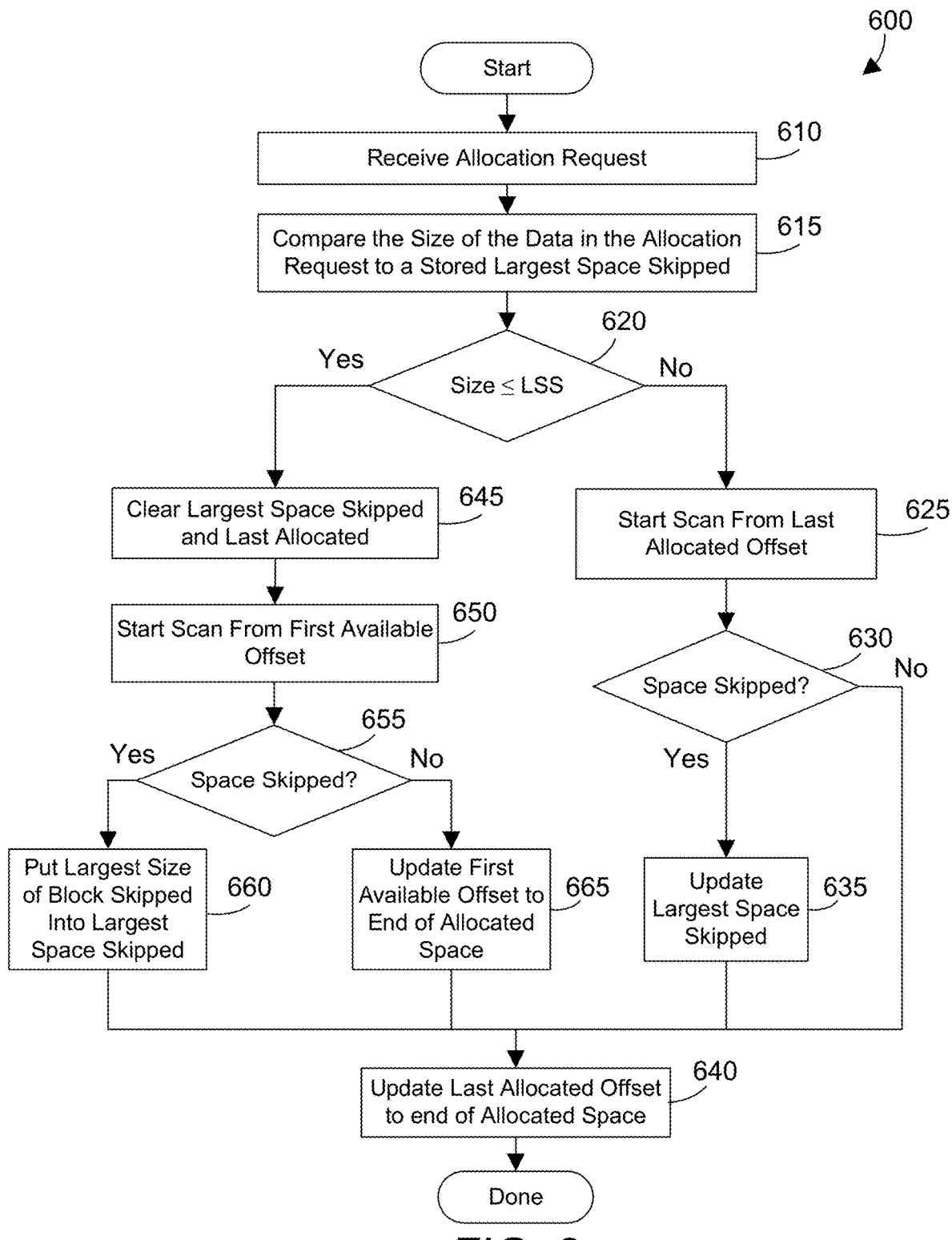
FIG. 6 is a flow diagram of another example method of scanning a file system space map for efficient detection of available space.

Referring to FIG. 6, a method 600 shows another suitable example for using stored offsets and a stored largest space skipped to increase the efficiency of scans for available space in a file system space map. Portions of method 600 are preferably performed by a space allocator 124 and the file system manager 125 shown in FIG. 1. First, receive an allocation request (step 610). Next, compare the size of the data in the allocation request to a stored largest space skipped (step 615). If the size of data in the allocation request is not less than or equal to the stored largest space skipped (step 620=no) then start the scan for space for the allocation request from the last allocated offset (step 625). If a space is skipped during the scan (step 630=yes) then update the largest space skipped (step 635) and then update the last allocated offset (step 640). If no space is skipped during the scan (step 630=no) then update the last allocated offset (step 640). If the size of data in the allocation request is less than or equal to the stored largest space skipped (step 620=yes) then clear the largest space skipped and the last allocated offset (step 645). Then start the scan for space for the allocation request from the first available offset (step 650). If a space is skipped during the scan (step 655=yes) then put the put the value of the largest size of blocks skipped during the scan into the largest space skipped (step 660) and then update the last allocated offset (step 640). If no space is skipped during the scan (step 655=no) then update the first available offset to the next space after the last allocated space (step 665). Method 600 is then done.

The claims and disclosure herein support an apparatus comprising: at least one processor; a memory coupled to the at least one processor; a space map that indicates available space in file system data blocks of a computer file system; and a space allocator residing in the memory and executed by the at least one processor, wherein the space allocator determines where to store data in the computer file system using the space map by comparing a size of data in an allocation request to a stored largest space skipped in a previous scan of the space map and then starts scanning the space map from a stored offset depending on the comparison.

The claims and disclosure herein further support a computer-implemented method executed by at least one processor for efficient detection of available space in a computer file system comprising: receiving an allocation request to store data in file system data blocks of the computer file system; comparing a size of data in the allocation request to a stored largest sized skipped in a previous scan of the space map; and starting a scan a space map from a stored offset depending on the comparison.

The claims and disclosure herein additionally support a computer-implemented method executed by at least one processor for efficient detection of available space in a computer file system comprising: receiving an allocation request to store data in file system data blocks of a computer file system using a space map; comparing a size of data in the allocation request to a stored largest sized skipped in a previous scan of the space map; when the size of the data in the allocation request is not less than or equal to the largest space skipped, starting a scan of the space map from a last allocated offset that indicates an offset into the space map where data was last allocated; when the size of the data in the allocation request is less than or equal to the largest space skipped, starting a scan of the space map from a first available, where the first available offset indicates an offset into the space map where the first unused space was found on a previous scan; and updating the largest space skipped after scanning the space map.

A space allocator in a file management system maintains and uses one or more offsets and a stored value of the largest space skipped on previous scans to increase the efficiency of scans for available space in a file system space map. When the space allocator determines a current allocation request is greater than the largest space skipped in the previous scan, a last allocated offset can be used to begin scanning to reduce the portion of the map to scan in order to find available space. When the space allocator determines the current allocation request is less than or equal to the largest space skipped in the previous scan, a first available offset can be used to begin scanning for an appropriate unused space.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a space map that indicates available space in file system data blocks of a computer file system; and
   a space allocator residing in the memory that, when executed by the at least one processor, receives an allocation request to store data in the file system data using the space map, compares a size of data in the allocation request to a stored largest sized skipped in a previous scan of the space map, and when the size of the data in the allocation request is not less than and not equal to the largest space skipped, starting a scan of the space map from a last allocated offset that indicates an offset into the space map where data was last allocated, and when the size of the data in the allocation request is less than or equal to the largest space skipped, starting a scan of the space map from a first available offset, where the first available offset indicates an offset into the space map where the first unused space was found on a previous scan.

2. The apparatus of claim 1 wherein the space allocator, when executed by the at least one processor, updates the largest space skipped and the stored offset after scanning the space map.

3. The apparatus of claim 1 wherein the space allocator, when executed by the at least one processor, updates the last allocated offset after scanning the space map.

4. The apparatus of claim 1 wherein the space map is a sequence of bits where each bit indicates whether a block of data in the file system data blocks is used or unused.

5. The apparatus of claim 1 wherein the space allocator is part of a file management system of a computer data system.

6. The apparatus of claim 5 wherein the file management system stores data in the file system data blocks on a removable media.

7. A computer-implemented method executed by at least one processor for efficient detection of available space in a computer file system comprising:
   receiving an allocation request to store data in file system data blocks of the computer file system;
   comparing a size of data in the allocation request to a stored largest sized skipped in a previous scan of the space map; and
   when the size of the data in the allocation request is not less than and not equal to the largest space skipped, starting a scan of the space map from a last allocated offset that indicates an offset into the space map where data was last allocated; and
   when the size of the data in the allocation request is less than or equal to the largest space skipped, starting a scan of the space map from a first available offset, where the first available offset indicates an offset into the space map where the first unused space was found on a previous scan.

8. The method of claim 7 further comprising updating the largest space skipped and the stored offset after scanning the space map.

9. The method of claim 7 further comprising updating the last allocated offset after scanning the space map.

10. The method of claim 7 wherein the space map is a sequence of bits where each bit indicates whether a block of data in the file system data blocks is used or unused.

11. The method of claim 7 wherein the allocation request is received by a file management system of a computer data system.

12. The method of claim 7 wherein the file system data blocks are stored on a removable media.

13. A computer-implemented method executed by at least one processor for efficient detection of available space in a computer file system comprising:
- receiving an allocation request to store data in file system data blocks of a computer file system using a space map;
- comparing a size of data in the allocation request to a stored largest sized skipped in a previous scan of the space map;
- when the size of the data in the allocation request is not less than and not equal to the largest space skipped, starting a scan of the space map from a last allocated offset that indicates an offset into the space map where data was last allocated;
- when the size of the data in the allocation request is less than or equal to the largest space skipped, starting a scan of the space map from a first available offset, where the first available offset indicates an offset into the space map where the first unused space was found on a previous scan; and
- updating the largest space skipped after scanning the space map.

14. The method of claim 13 further comprising updating the last allocated offset after scanning the space map.

15. The method of claim 13 wherein the space map is a sequence of bits where each bit indicates whether a block of data in the file system data blocks is used or unused.

16. The method of claim 13 wherein the file system data blocks are stored on a removable media.

* * * * *